Nov. 10, 1970   H. E. GOLDBERG   3,538,773
HYDROMETER

Filed March 16, 1967   2 Sheets-Sheet 1

INVENTOR.
HERBERT E. GOLDBERG
BY Hane and Nydick
ATTORNEYS

Nov. 10, 1970  H. E. GOLDBERG  3,538,773
HYDROMETER
Filed March 16, 1967  2 Sheets-Sheet 2

INVENTOR.
HERBERT E. GOLDBERG
BY Have and Nydick
ATTORNEYS 3,538,773
HYDROMETER
Herbert E. Goldberg, Keene, N.H., assignor to American Optical Corporation, Southbridge, Mass., a corporation of Delaware
Filed Mar. 16, 1967, Ser. No. 623,737
Int. Cl. G01n 9/12
U.S. Cl. 73—451          3 Claims

ABSTRACT OF THE DISCLOSURE

A hydrometer for measuring properties related to the densities of at least two liquids which densities are different from each other and change with the temperature of measurement at different rates, has a stem and a bulb. The stem assumes depths of immersion related to the properties to be measured as the hydrometer floats in the liquids and carries a scale having a first mark for reading the depth of immersion related to the larger one of the densities and a second mark for reading the depth of immersion related to the smaller one of the densities. The bulb has a volume extending to the first mark and the stem has a volume comprised between the first mark and the second mark. An actuating means such as a bellows portion of the bulb increases the bulb volume and an actuating means such as a bimetal strip decreases the stem volume as the temperature of the measurement increases thereby rendering both readings substantially independent of the temperature of the measurement.

---

This invention is concerned with the correction of the errors which occur when characteristics of a liquid are measured which change with temperature, such as specific gravity or density. Temperature errors usually are not constant, but depend on the quantity that is being measured, even within the comparatively narrow ranges covered by precision instruments.

Although the quantity actually measured by hydrometers is density, their scales or controls are often calibrated in units of more immediate practical value, such as percent sugar or freezing point, the calibration being based on tables which show the relationship between the density which would be measured at a standard temperature and the quantity read on the scale. Because the relationship between the standard density and the actual density depends on the temperature at which the measurement is made, scale calibrations are valid only over narrow ranges of temperature. For instance, it has been found that a hydrometer which has been calibrated to read a 15% sugar solution correctly at 68° F., will read the same solution as 14.7% if the temperature rises to 78° F. Since a change of concentration of as little as 1/10% is economically significant in the process industries, and since other errors are always present, the temperature of the sample at the time of measurement must be known within one or two degrees F., and corrections must be applied to the hydrometer reading whenever the temperature deviates from normal by that amount. This procedure is time consuming and often leads to errors.

It is an object of the present invention to provide simple and reliable means to render the readings of hydrometers substantially independent of temperature over all ranges of temperature normally encountered in laboratory or industrial use.

It is another object of the invention to provide structures of hydrometers which will assure satisfactory performance under severe operating conditions and without need for maintenance or adjustment.

Other objects of the invention, the principle of the devices, and several detailed examples of it, will be described in the following specification and drawings in which FIG. 1 is a schematic view of a hydrometer according to one form of the invention.

Figure 1:
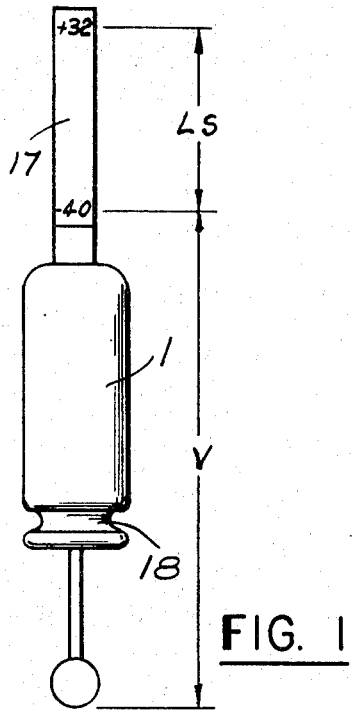

A hydrometer spindle designed to check the freezing point of ethylene glycol solutions is illustrated in FIG. 1. The stem 17 is calibrated for instance in degrees F. The volume of the body 1 below the −40 degree mark is V, the length of the scale between the −40 and the +32 degree marks is L, the cross-sectional area of the stem is S, the volume of the stem section between the two marks being LS, the stem below the −40° mark constituting part of the bulb. The length L depends on the ratio of volume V to crosssection S and controls the sensitivity of the instrument. Let W be the weight of the instrument.

Suppose now that a 53% solution (by volume) of ethylene glycol is to be measured, that its freezing point is −40 degrees F., and that its density is D at the temperature of measurement. The density of water at the same temperautre is assumed to be $D_0$. Under these circumstances, the length of the scale and the volume of the body are determined as follows:

$$V = W/D \qquad (1)$$

$$\frac{LS}{V} = \frac{D}{D_0} - 1 \qquad (2)$$

hence:

$$dL = \frac{V}{SD_0} dD$$

Since $D_0$ and $D$ change with temperature at different rates, at least two of the available parameters V, L and S must be altered in accordance with temperature changes, if the error is to be corrected both for the glycol solution and for water: A study of published density data of ethylene glycol solutions indicates, for instance, that if the temperature increases from 50 to 200 degrees F., the above mentioned 53% solution will expand by 3.3%, whereas water would expand by only 2.3%. To correct the temperature error of reading, the bulb and stem volumes must change as follows:

$$V_{200°}/V_{50°} = 1.033 \qquad (3)$$
$$(V+LS)_{200°}/(V+LS)_{50°} = 1.023$$

Assuming that for a typical hydrometer the volume of the bulb accounts for 90% of the total submersed volume:

$$V_{50°} = 9LS_{50°}$$

By substitution we find:

$$LS_{200°} = 93LS_{50°} \qquad (4)$$

Equations (3) and (4) indicate that for the present example the volume of the bulb should increase by 3.3%, and the length L of the scale should shrink by 7% as the temperature increases from 50 to 200 degrees F. This is necessary because the density difference between the two solutions is less at the higher temperature.

As appears from Equation (4) the volume of the stem can be changed by either changing the length L or the cross sectional area S of the stem. Therefore, the cross sectional area of the stem may be reduced by 7% as the temperature increases. In this case, the sensitivity of the hydrometer is increased with temperature, so as to match the response of the instrument to the fixed length of the scale.

Another, and perhaps mechanically simpler method to compensate for temperature error is based on the following consideration: Let the scale of a hydrometer read in units of $q$, where $q$ may represent standard density, degrees freezing point, percent sucrose or any other quantity of interest. Let $l$ represent the distance of the scale division $q$ from the base line of the scale. Under these assumptions $dl/dt$ would represent the rate of displacement of a scale division along the stem of the instrument, needed to compensate for the change of the reading with temperatures. The temperature error may be corrected at two points $q$ and $q_0$ by a simple straight line displacement of the entire scale, if $dl/dt$ is the same at these two points.

$$(dl/dt)_q = (dl/dt)_{q_0} \qquad (5)$$

Since $$dl/dt = dl/dq \times dq/dt$$

we have $$(dl/dq)_q/(dl/dq)_{q_0} = (dq/dt)_{q_0}/(dq/dt)_{q_0} \qquad (6)$$

$(dl/dq)_q$ is a measure of the spacing of the scale graduations at the point $q$. The ratio $(dl/dq)_q/(dl/dq)_{q_0}$ is, hence, a measure of the nonlinearity of the scale, and will be called the "escalation" of the scale. Similarly, the ratio $(dq/dt)_q/(dq/dt)_{q_0}$ is a measure of the nonlinearity of the error of reading due temperature changes and will be called the escalation of the temperature error of reading.

Equation (6) shows that under these circumstances the temperature error of reading can be corrected at all points of the scale by simple scale displacement, if the instrument is designed in such a way that the escalation of the scale is inversely proportional to the escalation of the temperature error of reading.

The foregoing considerations may be summarized by stating that temperature errors, which occur when quantities $q$ to be measured change with temperature $t$ at rates which depend on $q$, may be corrected by making two adjustments:

A.—The reading at one point must be corrected by conventional means, for instance, by displacing the scale with respect to the measuring mechanism, or by altering the bulb volume.

In addition, one of the following three mechanisms must be provided:

B1.—The distance which separates points $q_0$ and $q$ on the instrument scale is decreased as temperature increases. While this procedure is theoretically possible, it is not very practical.

B2.—The sensitivity of the instrument, that is the response of the measuring mechanism to changes in $q$ is increased as temperature increases.

B3.—The measuring mechanism of the instrument is designed in such a way that the escalation of the scale at point $q$ with respect to point $q_0$ is inversely proportional to the temperature coefficients $dq/dt$ at points $q$ and $q_0$. From a practical point of view this match of escalations need not be perfect, but should be sufficient to keep residual temperature errors within acceptable limits over the range of temperatures of interest.

Many mechanisms are available to make the above mentioned adjustments A and B in accordance with temperature changes.

A: The change of bulb volume V required for correction according to Equation (3) may be achieved for instance by employing a metallic bellows 18 (FIG. 1) filled with a liquid of suitable temperature expansion characteristics as described by Greene et al. in U.S. Pat. 2,301,273. This system would be very reliable, but is slow in its response to temperature changes. A more rapid response could be obtained if the bellows were filled with a gas, or if it contained a small amount of a liquid with high vapor pressure, such as ether or acetone. The volume of the bellows would change, depending on the pressure of the gas or the vapor pressure of the liquid.

Other more mechanical actuators to adjust the volume of a bellows as a function of temperature include bimetal strips and Bourdon springs and have been shown by Christie et al. in U.S. Pat. 1,935,564.

Figure 2:
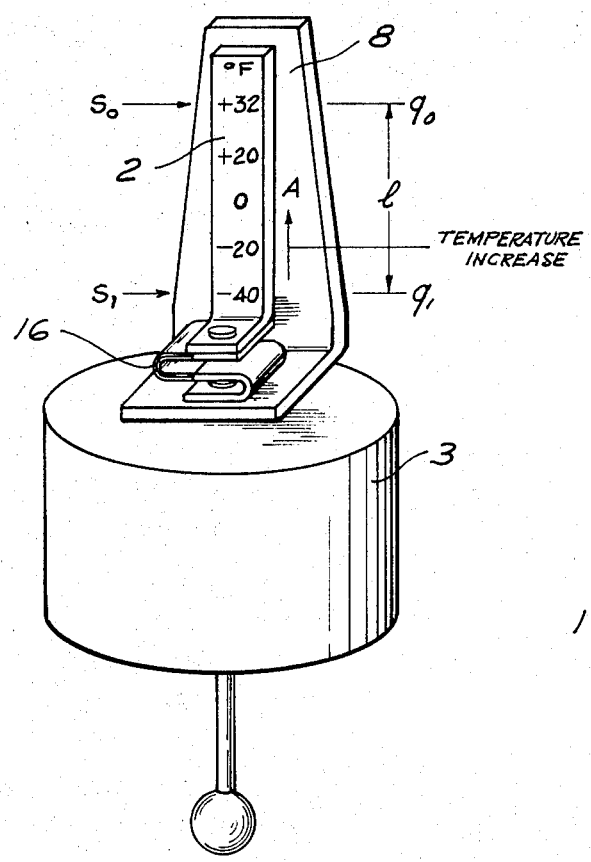
FIG. 2 is a schematic perspective view of another hydrometer according to the invention.

FIG. 2 illustrates a system in which the position of the scale is altered in accordance with temperature changes. The hydrometer comprises a bulb 3 which carries the hydrometer stem 8. One end of a reverse welded bimetal actuator 16 is attached to the stem or bulb. The other end is free to move in response to temperature changes and carries a scale 2. When the temperature of liquid to be measured increases, the bimetal element will deform itself so as to move the scale 2 in the direction of the arrow A with respect to the body 3 and stem 8 of th hydrometer.

Figure 3:
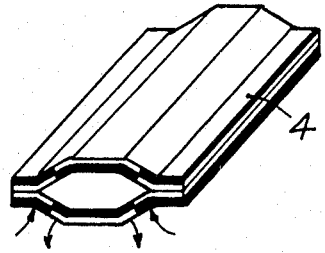
FIG. 3 is a perspective view of a hydrometer stem according to the invention.
Figure 4:
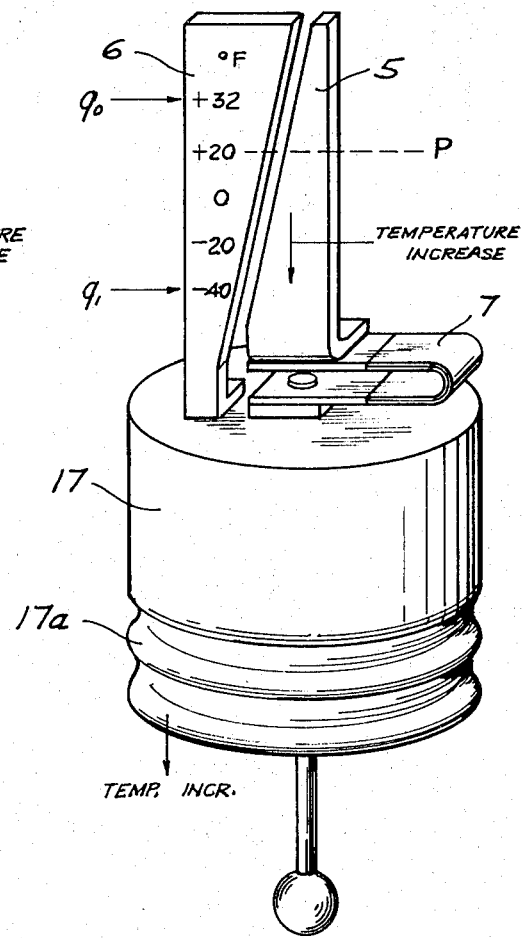
FIG. 4 is a schematic perspective view of a hydrometer according to another form of the invention.

B2: Methods of altering the sensitivity of a hydrometer according to Equation (4) are illustrated in FIGS. 3 and 4. A hollow stem 4 has an elliptical cross section and may be fabricated as a composite bimetal assembly as illustrated in FIG. 3. As the temperature increases, the reverse welded walls of the stem 4 would deform, for instance as indicated by the arrows, by increasing the major axis of the elliptical cross sectional area of the stem thereby making the stem more elliptical and thus decreasing its cross sectional area.

FIG. 4 shows an alternate arrangement in which the stem is composed of a fixed element 6 which is attached to a bulb 17 and a moving element 5 which is carried by one end of a bimetal actuator 7, the other end of which is attached to the bulb 17. The bulb has a bellows portion 17a to permit a variation of the volume of the bulb. The thermal actuator is designed so that the element 5 will move downward as the temperature of the actuator increases, thus varying the cross section of the stem. If moving element 5 has a tapered configuration as shown in the figure, the combined cross section of stem assembly 5, 6 at any point P will decrease when the element 5 is displaced downward in accordance with temperature increases.

B3: The escalation of the hydrometer scale may be controlled to satisfy Equation (6) by giving the stem 8, a configuration tapered toward the top of the stem, for instance as illustrated in FIG. 2. Returning to the example of the 53% ethylene glycol solution employed previously, let us assume that the cross section of the stem is S at the —40 degree and $S_0$ at the 32 degree mark, and that the displacement of the scale with respect to the stem is $x$ for the previously used temperature change from 32 to 200 degrees F. Under these conditions we have $$xS = .033 \; V$$

and $$xS_0 = .023 \; (V + V/9)$$

We find that the ratio of the cross sections of the stem should be $$S/S_0 = 1.27$$

Having thus described my invention, what I claim as new and desire to secure by Letters Patent is:

1. A hydrometer for measuring quantities related to the densities of at least two liquid substances, said densities being different from one another and changing with the temperature of measurement at rates different from one another, said hydrometer comprising a bulb and a stem, said stem assuming depths of immersion as said hydrometer floats in said liquid substances, said depths of immersion of the stem being related to the quantities to be measured, said stem carrying a scale comprising a first mark $q$ for reading the depth of immersion related to the larger of said densities and a second mark $q_0$ for reading said depth of immersion related to the smaller of said densities, said bulb having a bulb volume extending to said first mark, said stem having a temperature variable volume comprised between said first and second marks, first means to increase said bulb volume in response to an increase of the temperature of measurement, and second means to decrease said stem volume in response to an increase of the temperature of measurement thereby rendering both said readings substantially independent of said temperature of measurement.

2. A hydrometer for measuring quantities related to the densities D and $D_o$ of at least two liquid substances, said densities being different from one another and changing with the temperature of measurement at rates $dD/dt$ and $dD_o/dt$ different from one another, said hydrometer comprising a bulb and a stem having a changing cross section along its length, said stem assuming depths of immersion as said hydrometer floats in said liquid substances to be measured, said depths of immersion being related to said quantities to be measured, said stem carrying a scale comprising a first mark $q$ for reading the depth of immersion related to D, the larger of said densities and a second mark $q_o$ for reading the depth of immersion related to $D_o$, the smaller of said densities, the immersed volumes below said marks being V and $V_o$ respectively, said stem having a cross section S near said first mark and a cross section $S_o$ near said second mark, said hydrometer further comprising temperature responsive means to displace said scale with respect to said stem so as to alter said volumes V and $V_o$ in accordance with temperature changes at rates $dV/dt$ and $dV_o/dt$ respectively, and said cross sections being proportioned so that the ratio $S/S_o$ approximately equals the ratio of said density changes $(dD/dt)/(dD_o/dt)$, so as to render the ratio of said volume changes $(dV/dt)/(dV_o/dt)$ approximately equal to the ratio of said density changes thereby causing both said readings to be substantially independent of said temperature of measurement.

3. A hydrometer for measuring quantities Q related to the densities of at least two liquid substances, said quantities Q changing with the temperature of measurement at rates $dQ/dt$ different from one another, said hydrometer comprising a body and a scale, said scale carrying marks $q$ and $q_o$ for reading said quantities Q and a base line, the distances of said marks from said base line being $l$, means to displace said scale with respect to said body in accordance with temperature changes, said spacing $dQ/dl$ of said marks being approximately inversely proportional to said rate of change $dQ/dt$ of said quantities to be measured and increasing as the densities associated with said quantities Q decrease, thus equalizing said displacement of said scale required to render both said readings substantially independent of temperature.

References Cited
UNITED STATES PATENTS

| | | | |
|---|---|---|---|
| 794,697 | 7/1905 | Beck et al. | 73—451 |
| 1,935,564 | 11/1933 | Christie et al. | 73—449 |
| 2,185,205 | 1/1940 | Linebarger | 73—449 |
| 2,267,115 | 12/1941 | Linebarger | 73—449 |
| 2,301,273 | 11/1942 | Greene et al. | 73—449 |

RICHARD C. QUEISSER, Primary Examiner

J. K. LUNSFORD, Assistant Examiner